United States Patent Office 2,945,317
Patented July 19, 1960

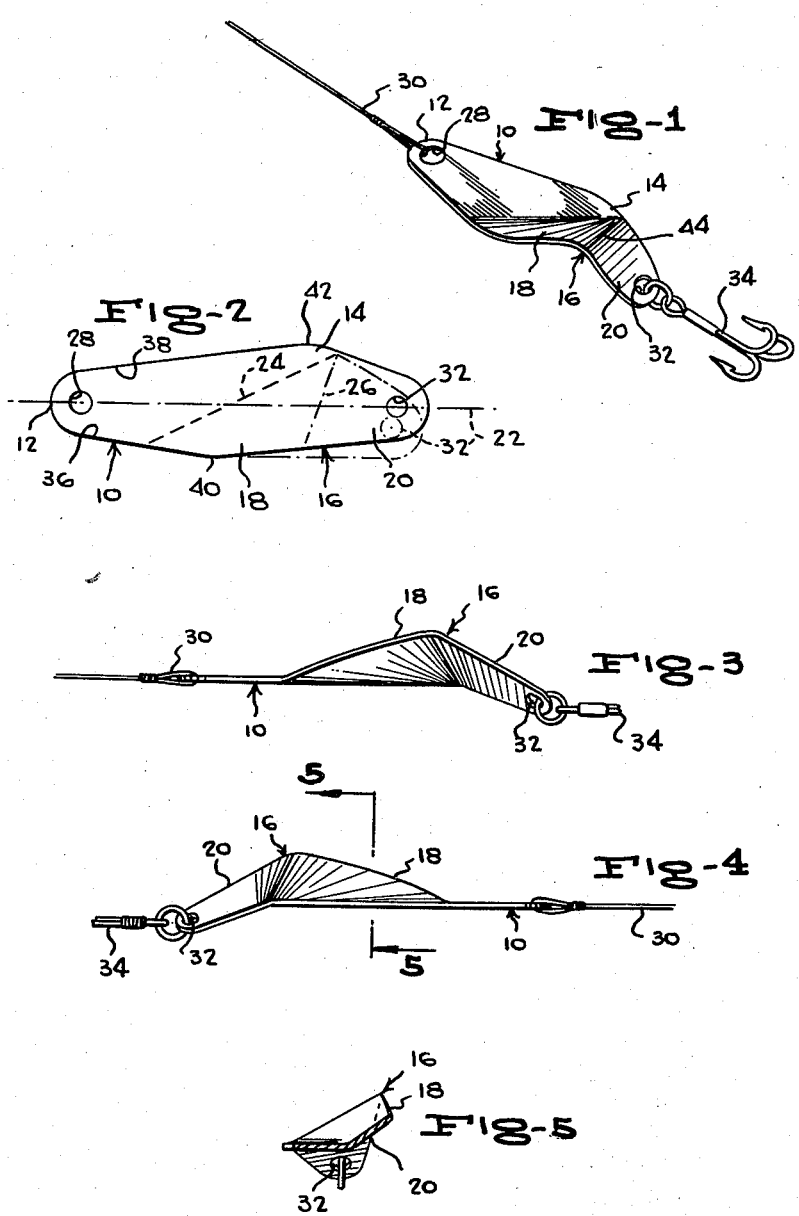

2,945,317

FISHING LURE

Joseph J. Wittmann, Jr., 4637 E. 14th St., Tucson, Ariz.

Filed Nov. 7, 1958, Ser. No. 772,628

1 Claim. (Cl. 43—42.5)

The present invention relates to a fishing lure of the spoon type.

An object of the present invention is to provide a fishing lure which lends itself to easy casting and retrieving, which has a motion in the water when retrieved simulating a minnow with a rapid movement to one side and a slower movement to the other side.

Another object of the present invention is to provide a fishing lure which is reversible so as to enable the user thereof to vary the motion of the lure in the water as desired.

A further object of the present invention is to provide a fishing lure which is simple in structure, one economical to manufacture and assemble, and one which is highly effective in action.

These and other objects and advantages of the present invention will be fully apparent from the following description when taken in conjunction with the annexed drawing, in which:

Figure 1 is an isometric view of the lure according to the present invention, shown attached to the end portion of the fishing line and having a fish hook attached thereto;

Figure 2 is a plan view of the sheet material of the lure, prior to bending;

Figure 3 is a side elevational view, taken from one side;

Figure 4 is a side elevational view, taken from the other side; and

Figure 5 is a view taken on the line 5—5 of Figure 4.

Referring to the drawing in which like numerals indicate like parts throughout the several views, the lure of the present invention comprises a horizontally disposed flat sheet-like forward section having a leading end and a trailing end. The forward section is designated generally by the reference numeral 10, the aforesaid ends by the numerals 12 and 14, respectively.

The lure includes a transversely disposed distorted inverted V-shaped sheet-like rear section 16 positioned behind the trailing end 14 of the forward section 10. The rear section has sides which are substantially flat and which form legs 18 and 19.

The lower edge of one of the legs 18 of the rear section 16 merges into the trailing end 14 of the forward section 10. The lower edge of the other leg 20 of the rear section 16 lies to one side of the longitudinal centerline of the forward section 10, the centerline being shown in dotted lines in Figure 2 and designated by the numeral 22. The lower edge of the leg 20 of the rear section 16 is also below the plane of the forward section 10, as shown most clearly in Figures 3 and 4.

The leg 18 of the rear section 16 is longer than the leg 20 and is adjacent and slopes downwardly to the trailing end 14 of the forward section 10. The lower edge of the longer leg 18 merges into the trailing end 14 of the section 10 along a line drawn obliquely with respect to the longitudinal centerline of the forward section 10.

This line is shown dotted in Figure 2 and designated by the reference numeral 24.

The shorter leg 20 of the rear section 16 is remote from the trailing end 14 of the section 10 and the apex of the rear section 16 lies along another line also drawn obliquely with respect to the longitudinal centerline 22. This latter-named line is designated in Figure 2 by the reference numeral 26. The lines 24 and 26 have their complemental one ends merging together at a single point on one of the side edges of the lure of the present invention.

Means is provided, embodying a first hole 28, on the leading end of the forward section 10 for attachment of a fishing line 30 and other means, embodying another hole 32, is provided on the leg 20 of the rear section 16 for attachment of a fish hook 34.

An important feature of the present invention is that the lure may be reversed so that the fishing line 30 is attached in the hole 32 and the fish hook 34 attached in the hole 28.

The side edges 36 and 38 of the lure diverge outwardly from the leading end 12 of the forward section 10 to points 40 and 42, respectively, intermediate the leading end 12 and the lower end of the leg 20 of the rear section 16. From the points 40 and 42, the side edges 36 and 38 converge toward the lower end of the leg 20. This results in the widest parts of the lure, namely, the points 40 and 42, being offset from each other with the point 40 intermediate the complemental one ends of the lines 24 and 26 and with the point 42 intermediate the converged ends of the lines 24 and 26 and the leading end 12 of the forward section 10. With the lure thus formed, the hole 32 and the attached hook 34 is to one side of the longitudinal centerline 22, it being understood that Figure 2 is a plan view of the sheet material from which the lure is fabricated prior to bending along the lines 24 and 26. The offset location of the hole 32 after bending is shown in dotted lines in Figure 2 and designated by the reference numeral 32'.

The apex of the rear section 16, designated by the numeral 44, is seen to extend from the side edge 36 at a point intermediate the point 40 and the lower end of the leg 20 to the intersection of the line 24 with the side edge 38.

As above described, the lure has a forward section 10, a rear section 16 having a forward upwardly and rearwardly sloping portion between the line 24 and the line 26 or apex 44 and a downwardly sloping portion extending from the line 26 or apex 44 to the lower end of the leg 20 of the rear section 16.

In use, the lure constructed according to the present invention has a forward motion when retrieved on the end of a fishing line first to one side rapidly and then to the other side slowly. This action is the result of the impact of the upwardly sloping upper face of the leg 18 with the water followed by impact of the underface of the leg 20 with the water.

When reversed, and the line 30 attached in the hole 32 and the hook 34 attached in the hole 28, the motion of the lure in the water when retrieved is rapidly to one side and slowly to the other side at speeds differing from the sideways motion of the lure before reversing.

What is claimed is:

A fishing lure comprising a horizontally disposed flat sheet-like forward section having a leading end and a trailing end, an inverted V-shaped sheet-like rear section having sides which are substantially flat and which form legs, one of the legs of said rear section being longer than the other leg, said rear section being behind the trailing end of said forward section with the longer leg adjacent the trailing end and having the lower edge of the longer leg merging into the trailing end of said forward section along a first line drawn obliquely to the longitudinal centerline of said forward section, the shorter leg remote from the trailing end of said forward section, and the apex lying along a second line drawn obliquely to said longitudinal centerline of said forward section, complemental one ends of said first and second lines merging together at one of the side edges of said rear section, the lower edge of the shorter leg of said rear section lying to one side of said longitudinal centerline and below the plane of said forward section.

References Cited in the file of this patent

UNITED STATES PATENTS 2,667,007    Heron ------------------ Jan. 26, 1954